Jan. 26, 1971  A. E. PLEGAT  3,558,184
HINGED DEVICE FOR PIVOTING PANEL, PARTICULARLY
FOR MOTOR VEHICLE DOOR
Filed June 14, 1968  4 Sheets-Sheet 3
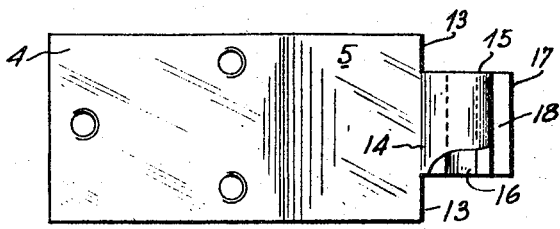
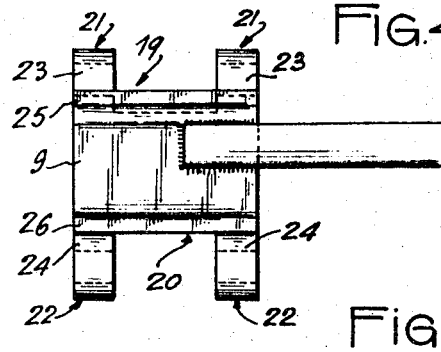
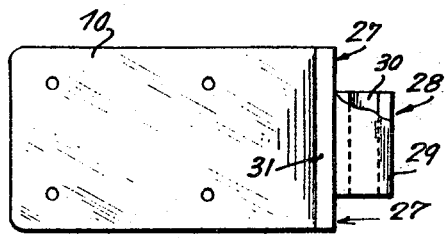
Inventor
Alain Edouard Plegat
by Alvin Browdy
Attorney

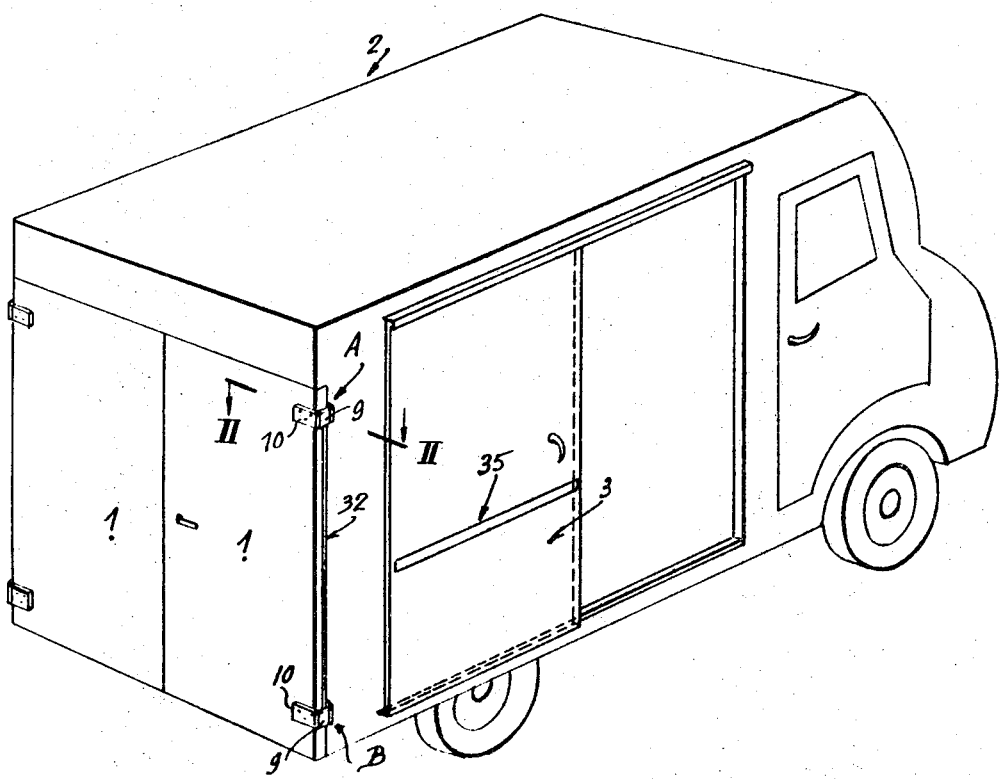

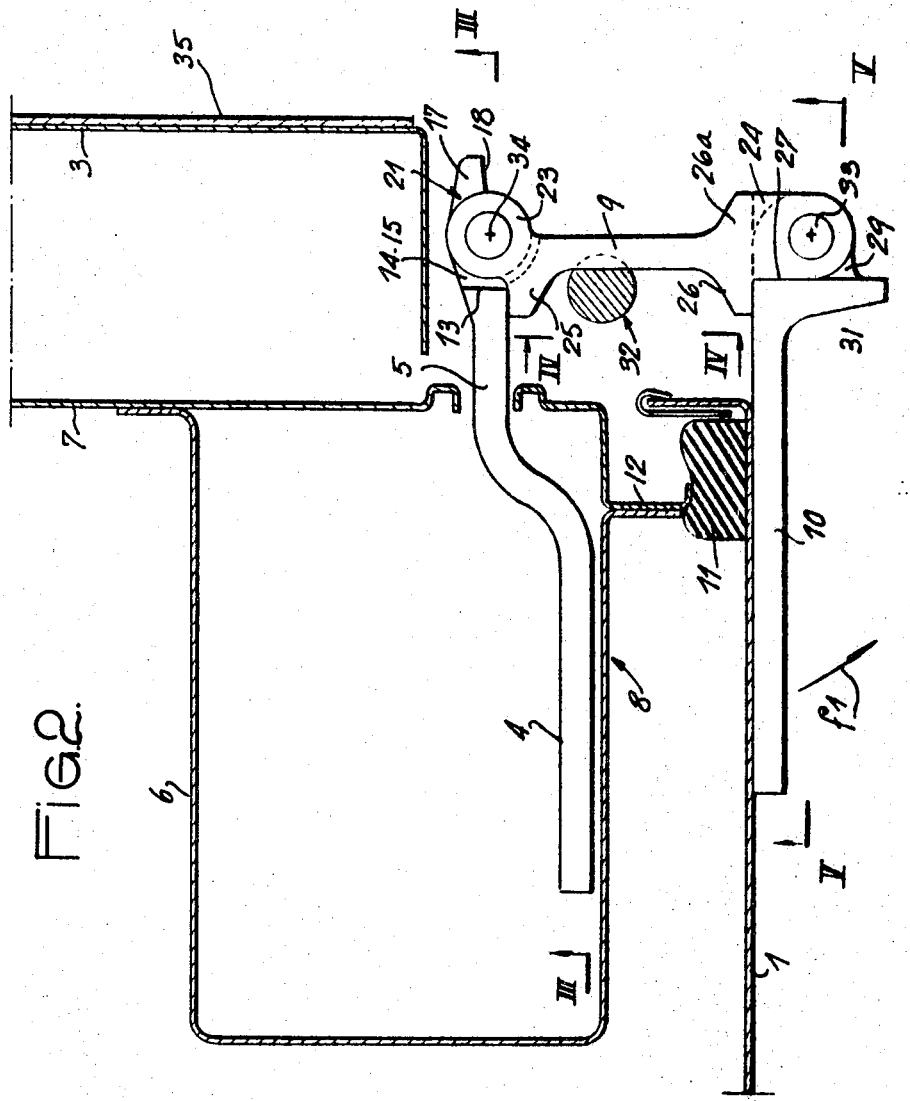

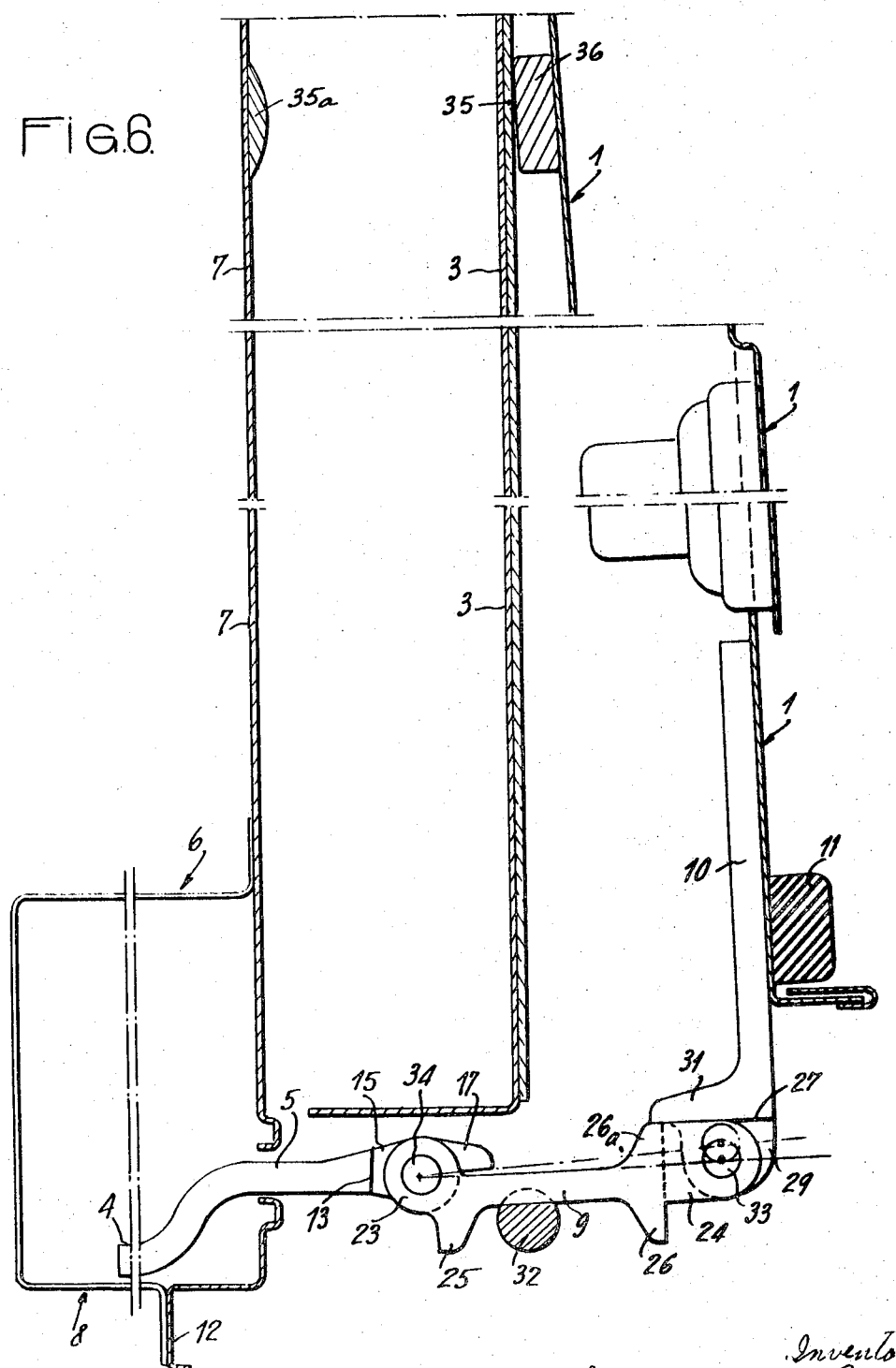

United States Patent Office 3,558,184
Patented Jan. 26, 1971

3,558,184
HINGED DEVICE FOR PIVOTING PANEL, PARTICULARLY FOR MOTOR VEHICLE DOOR
Alain Edouard Plegat, Asnieres, France, assignor to Societe Anonyme des Usines Chausson, Asnieres, France, a company of France
Filed June 14, 1968, Ser. No. 751,645
Claims priority, application France, June 5, 1967, 109,103
Int. Cl. B60j 5/12
U.S. Cl. 296—146                3 Claims

ABSTRACT OF THE DISCLOSURE

Hinged device for pivoting panel having at least two hinge assemblies connecting a pivoting panel to a support, said two assemblies each comprising a plate forming a connecting rod which is hinged, on the one hand, to the pivoting panel and, on the other hand, to the support and connecting means being provided for connecting said plates forming connecting-rods so that they are constantly aligned between each other whatever the angle formed by the pivoting panel in relation to the support.

---

Doors of motor vehicles, and more particularly the rear doors of motor vehicles, are generally mounted on the body by means of hinges devised so that when open to their widest extent, the doors are placed, either appreciably in the extension of side panels of the body of the vehicle, or externally and perpendicularly to these panels.

According to the construction of the hinges, the stopped vehicle, during loading or unloading, thus occupies a width or length distinctly greater than its side measurements and is incompatible with circulation or parking requirements, specifically in busy areas.

The present invention obviates these disadvantages and creates a new door hinge which also allows the whole of the effective opening section to be used afforded by the door, without said door projecting in relation to the vehicle to an extent appreciably greater than its thickness.

The object of the invention, is also devised for making possible, specifically for utilitarian vehicles of narrow gauge, the maximum opening of rear doors and the eventual simultaneous using of a sliding side door that can be moved up to the extreme rear of the vehicle.

The device of the invention is not restricted to the application referred to above, but on the contrary, is of very general application, for in all cases it allows vehicle doors to be opened much wider than is at present possible.

According to the invention, the device comprises at least two hinge assemblies connecting a pivoting panel to a support, the said two assemblies each comprising a plate forming connecting-rod which is hinged, on the one hand, on the pivoting panel, and on the other hand, on the support and connecting means are provided for joining said plates forming connecting-rods so that they are constantly aligned together whatever the angle formed by the pivoting panel in relation to the support.

Various other characteristics of the invention will moreover be revealed by the detailed description which follows:

A form embodiment of the object of the invention is shown, by way of non-restrictive example, in the attached drawing.

FIG. 1 is a diagrammatical perspective showing the putting into operation of the hinges of the invention on the rear doors of a motor vehicle.

FIG. 2 is a partial cross section, on a larger scale, taken substantially along the line II—II of FIG. 1.

FIGS. 3 to 5 are elevations, on a similar scale, seen substantially along the lines III—III, IV—IV and V—V of FIG. 2.

FIG. 6 is a similar cross section to that of FIG. 2 and showing a characteristic position of the device.

FIG. 1 shows the applying of the hinges according to the invention, to the support and joint of pivoting rear doors 1 of a utilitarian motor vehicle 2, also comprising a sliding side door 3. Each door 1 is supported by at least two hinges A and B.

According to the drawing each supporting hinge and joint of a door 1 comprises a plate 4 with a curved counter-part 5. The plate 4 is fixed, for example, to the inside of a vertical box beam 6, forming the rear upright of the body of the vehicle 2, so that the counter-curved part 5 extends outside the side panel 7 fixed on the beam 6 and slightly to this side of the rear face 8 partly confined by said beam 6. The fixing of the plate 4 is moreover provided so that the counter-curved part 5 projects beyond the side panel 7 to a small extend which is much less than the thickness of the sliding side door 3 shown in FIG. 2 in its open position. The counter-curved part 5 of the plate 4 is connected by an intermediate joint plate 9 forming a connecting-rod, to a rectilinear plate 10 fixed to the door 1. The length of the intermediate joint plate 9 is calculated so that in the closed position of the door 1, shown in FIG. 2, a flexible pad 11 fixed on the inner face of said door, is pressed and partially crushed against a turned-over edge 12 formed by the beam 6 projecting from the rear face 8.

FIG. 3 shows that the counter-curved part 5 of the plate 4 has starting from its crosswise edge, two lateral cuts 13 confining a lug 14 made in the shape of a cylindrical sheath 15 of which 16 designates the bore. The sheath 15 is extended by a heel 17 extending appreciably in the prolongation of the counter-curved part 5 having in the direction of the plate 4 a relief face 18.

FIG. 4 shows that the intermediate joint plate 9 has, starting from its two transversal edges, two middle notches 19 and 20, separating two pairs of parallel wings 21 and 22 which form caps and confine bearings 23 and 24. The plate 9 forms projecting, two transversal casings 25 and 26 bordering the wings 21–22. Moreover, the plate 9 also projecting, but opposite to the casing 26, makes a second casing 26a.

FIG. 5 shows that the plate 10 has, starting from one of its transversal edges, two side cuts 27 and a middle lug 28 whose height corresponds to the distance between the wings 22 of the intermediate joint plate 9. The lug 28 has an appreciably cylindrical part 29 drilled with an axial hole 30. The plate 10 also forms a rib 31 bordering the cylindrical part 29.

The plates 9 of the hinges A and B are made integral between them by a rod or other connecting part 32 sufficiently resistant to twisting. Two articulation spindles 33 and 34 enable pivoting movements of the door 1 to be effected.

This embodiment enables the imparting to the connecting part 32 and plates 9 that it forms, various appearances and specifically the part 32 and plates 9 can be streamlined to form a bodywork element.

When the door 1 is closed as shown in FIG. 2, the casings 25 and 26 of the intermediate articulation plate 9 form abutments on which the plate 4 and the plate 10 bear, so that the door 1 can only assume one closing position for which the intermediate articulation plates 9 extend appreciably parallel to the side panel 7 of the vehicle 2.

The opening of the door 1, in the direction of the arrow $f_1$, entails at least the pivoting of the plate 10 around articulation pins 33 up to the moment when the rib 31 abuts against the casings 26a of the plates 9. The plates 9 also pivot around articulation pins 34 up to the moment when said plates 9 abut against the casings 17 of the plate 4. The two pivoting movements described above are most frequently conjugated, i.e., they occur simultaneously, but the plates 9 of the two hinges A and B remain aligned because the connection rod 32 makes them integral. It follows that the door 1 does not risk being subjected to buckling stresses.

FIG. 6 shows that in the maximum open position the plates 9 form prolongators for the plates 4 of the hinges A and B so that the door 1 is opened, in relation to the lateral side 7 of the body, to a sufficient extent so that the sliding door 3 can be introduced behind the door 1 appreciably turned back parallel to the side 7.

To prevent any banging, the door 1 can now be locked on the sliding door 3 by any suitable means, specifically by cooperating magnetic elements 34 and 35 respectively fixed on the door 1 in the shape of magnets and on the sliding door 3 in the shape of a small bar provided over the length of said door, to enable the door to be maneuvered, while keeping the door 1 locked in the open position.

In the case where the sliding door 3 is in the closed position, the door 1 can come into contact with the side 7 also provided with a magnetic element 35a or other suitable member.

Another alternative (not shown) consists of connecting the plates 4 and 10 and the plates 9 forming connecting-rods of the two hinges A and B by two articulation spindles which are common to said hinges A and B. In this case, the connecting part 32 is no longer necessary as its function is carried out by the common spindles.

The invention is not restricted to the example of embodiment, shown and described in detail, for various modifications can be applied to it without going outside of its scope.

I claim:

1. A vehicle door structure comprising a door panel, a supporting frame for said door panel on a vehicle body, and at least two hinge units connected to said door panel and to said supporting frame of said vehicle body at the rear lateral portion thereof, each said hinge unit comprising a joint plate both ends of which are respectively pivotally mounted to said door panel and to said frame whereby said plate forms a connecting rod between said door panel and vehicle body, a rod extending between said plates for rigidly connecting together the plates of said two hinge units whereby they are constantly in aligned relationship whatever the angle formed by said door panel and vehicle body, said plate of each said hinge unit further having lateral protruding portions at both ends thereof delimiting stops whereby pivoting extent of said door panel is limited with respect to said plates, pivoting of said plates with respect to said vehicle body being also limited, whereby said plates can extend substantially at right angle with longitudinal axis of said vehicle and said door panel can be aligned with lateral side of said vehicle when in open position.

2. A vehicle door structure as set forth in claim 1 in which the length of the plates forming connecting-rods is arranged to keep the door at a sufficient distance from the lateral side of the vehicle for confining between this door in its maximum open position and said lateral side of the vehicle, a space for housing a sliding side door that the vehicle also possesses.

3. A vehicle door structure as set forth in claim 1 in which locking means for the pivoting door in the fully opened position are provided, on the one hand, on the lateral side of the vehicle, and on the other hand, on the sliding door of the vehicle.

References Cited

UNITED STATES PATENTS 2,177,826   10/1939   Hansen   49—246X
2,072,641   3/1937   Madland   49—246X

FOREIGN PATENTS 732,771   6/1932   France   49—246

PHILIP GOODMAN, Primary Examiner

U.S. Cl. X.R.

49—246